US012492302B2

(12) United States Patent
Thitsartarn et al.

(10) Patent No.: US 12,492,302 B2
(45) Date of Patent: Dec. 9, 2025

(54) KIT FOR PRODUCING A POLYOLEFIN COMPOSITE

(71) Applicants: Agency for Science, Technology and Research, Singapore (SG); Thai Polyethylene Co., Ltd., Bangkok (TH)

(72) Inventors: Warintorn Thitsartarn, Singapore (SG); Xikui Zhang, Singapore (SG); Jayven Chee Chuan Yeo, Singapore (SG); Chaobin He, Singapore (SG); Nopphawan Phonthammachai, Phichit (TH); Tanapon Sukachonmakul, Bangkok (TH)

(73) Assignees: Agency for Science, Technology and Research (SG); Thai Polyethylene Co., Ltd. (TH)

( * ) Notice: Subject to any disclaimer, the term of this patent is extended or adjusted under 35 U.S.C. 154(b) by 806 days.

(21) Appl. No.: 17/639,872

(22) PCT Filed: Sep. 4, 2020

(86) PCT No.: PCT/SG2020/050515
§ 371 (c)(1),
(2) Date: Mar. 2, 2022

(87) PCT Pub. No.: WO2021/045689
PCT Pub. Date: Mar. 11, 2021

(65) Prior Publication Data
US 2022/0332929 A1 Oct. 20, 2022

(30) Foreign Application Priority Data
Sep. 5, 2019 (SG) .............................. 10201908204P

(51) Int. Cl.
*C08L 23/12* (2006.01)
(52) U.S. Cl.
CPC ......... *C08L 23/12* (2013.01); *C08L 2205/035* (2013.01); *C08L 2310/00* (2013.01)
(58) Field of Classification Search
None
See application file for complete search history.

(56) References Cited

U.S. PATENT DOCUMENTS

| 6,087,446 A | 7/2000 | Klosiewicz |
| 8,231,943 B2 * | 7/2012 | Perez ................. B29C 65/5042 427/388.1 |
| 8,481,614 B2 | 7/2013 | Mantzivis |
| 9,181,379 B2 | 11/2015 | Backer et al. |
| 2005/0211580 A1 | 9/2005 | Kaszubski et al. |
| 2013/0300020 A1 | 11/2013 | Leibler et al. |
| 2017/0342222 A1 | 11/2017 | Spijkerman |

FOREIGN PATENT DOCUMENTS

| EP | 3072937 A1 | 9/2016 | |
| WO | 1997011122 A1 | 3/1997 | |
| WO | 1998001498 A1 | 1/1998 | |
| WO | 2006138637 A1 | 12/2006 | |
| WO | WO-2009143602 A1 * | 12/2009 | .............. C08L 51/06 |
| WO | 2015006547 A1 | 1/2015 | |
| WO | WO-2015161380 A1 * | 10/2015 | ............. B05D 7/146 |

OTHER PUBLICATIONS

International Search Report for International Application No. PCT/SG2020/050515 dated Nov. 4, 2020, pp. 1-3.
Written Opinion of the International Searching Authority for International Application No. PCT/SG2020/050515 dated Nov. 4, 2020, pp. 1-6.

* cited by examiner

*Primary Examiner* — Katarzyna I Kolb
(74) *Attorney, Agent, or Firm* — Shackelford, McKinley & Norton, LLP

(57) ABSTRACT

There is provided a kit comprising a first component comprising a first polyolefin and a polymerisable epoxide resin, wherein the first polyolefin is a major phase of the first component, and a second component comprising a second polyolefin and a catalytic agent. There is also provided a method of providing a polyolefin composite, the polyolefin composite comprising a first polyolefin, a polymerisable epoxide linker and a second polyolefin, the method comprising mixing a first component comprising a first polyolefin and a polymerisable epoxide resin, wherein the first polyolefin is a major phase of the first component; and a second component comprising a second polyolefin and a catalytic agent, to form a mixture, and processing the mixture to obtain the polyolefin composite.

20 Claims, 5 Drawing Sheets

| Sample | MPP (wt%) | Epoxy (wt%) | GF (wt%) | Flexural | | Tensile | | Impact Strength (kJ/m²) |
| --- | --- | --- | --- | --- | --- | --- | --- | --- |
| | | | | Modulus (GPa) | Strength (MPa) | Modulus (GPa) | Strength (MPa) | |
| PP | 0 | 0 | 0 | 2.09 ± 0.04 | 46.70 ± 0.80 | 1.21 ± 0.05 | 26.10 ± 1.60 | 6.86 ± 0.41 |
| | 5 | 0 | 0 | 1.98 ± 0.09 | 46.30 ± 1.24 | 1.53 ± 0.03 | 28.40 ± 0.18 | 7.00 ± 0.26 |
| Example 1 | 5 | 5 | 10 | 3.17 ± 0.06 | 64.72 ± 1.57 | 2.12 ± 0.06 | 34.86 ± 0.59 | 4.8 ± 0.05 |
| | 5 | 5 | 20 | 4.08 ± 0.12 | 78.29 ± 1.43 | 2.92 ± 0.09 | 42.28 ± 0.72 | 6.1 ± 0.4 |
| Comparative 1 | 5 | 5 | 10 | 3.25 ± 0.10 | 71.74 ± 0.44 | 2.29 ± 0.10 | 38.77 ± 1.85 | 6.6 ± 2.8 |
| | 5 | 5 | 20 | 4.50 ± 0.11 | 88.90 ± 0.32 | 3.43 ± 0.09 | 50.91 ± 1.44 | 7.7 ± 0.2 |

FIG. 1

| Sample | MPP (wt%) | Epoxy (wt%) | GF (wt%) | Flexural Modulus (GPa) | Flexural Strength (MPa) | Tensile Modulus (GPa) | Tensile Strength (MPa) | Impact Strength (kJ/m²) |
|---|---|---|---|---|---|---|---|---|
| PP | 0 | 0 | 0 | 2.09 ± 0.04 | 46.70 ± 0.80 | 1.21 ± 0.05 | 26.10 ± 1.60 | 6.86 ± 0.41 |
|  | 5 | 0 | 0 | 1.98 ± 0.09 | 46.30 ± 1.24 | 1.53 ± 0.03 | 28.40 ± 0.18 | 7.00 ± 0.26 |
| Example 1 |  |  |  |  |  |  |  |  |
| 0 Week | 5 | 5 | 10 | 3.17 ± 0.06 | 64.72 ± 1.57 | 2.12 ± 0.06 | 34.86 ± 0.59 | 4.8 ± 0.05 |
|  | 5 | 5 | 20 | 4.08 ± 0.12 | 78.29 ± 1.43 | 2.92 ± 0.09 | 42.28 ± 0.72 | 6.1 ± 0.4 |
| 1 Week | 5 | 5 | 10 | 3.07 ± 0.01 | 67.66 ± 0.50 | 2.28 ± 0.02 | 34.43 ± 0.18 | 5.2 ± 0.6 |
|  | 5 | 5 | 20 | 4.02 ± 0.03 | 82.77 ± 1.24 | 3.08 ± 0.04 | 45.34 ± 0.48 | 6.3 ± 0.05 |
| 2 Weeks | 5 | 5 | 10 | 2.97 ± 0.05 | 62.35 ± 0.43 | 2.03 ± 0.04 | 32.49 ± 0.61 | 4.6 ± 0.6 |
|  | 5 | 5 | 20 | 3.84 ± 0.19 | 75.63 ± 2.66 | 2.95 ± 0.04 | 40.59 ± 0.41 | 5.1 ± 0.2 |
| 3 Weeks | 5 | 5 | 10 | 2.92 ± 0.17 | 62.43 ± 3.12 | 2.30 ± 0.03 | 35.02 ± 0.50 | 4.7 ± 0.3 |
|  | 5 | 5 | 20 | 4.10 ± 0.04 | 83.78 ± 2.18 | 3.22 ± 0.08 | 44.64 ± 0.33 | 5.9 ± 0.4 |
| 4 Weeks | 5 | 5 | 10 | 2.92 ± 0.08 | 64.34 ± 1.66 | 2.28 ± 0.03 | 35.18 ± 0.64 | 5.0 ± 0.2 |
|  | 5 | 5 | 20 | 3.79 ± 0.17 | 79.86 ± 1.16 | 3.23 ± 0.02 | 46.76 ± 0.15 | 6.5 ± 0.07 |
| 8 Weeks | 5 | 5 | 10 | 2.79 ± 0.06 | 60.32 ± 0.97 | 2.01 ± 0.06 | 32.61 ± 0.28 | 5.5 ± 0.5 |
|  | 5 | 5 | 20 | 3.81 ± 0.02 | 77.31 ± 0.82 | 2.88 ± 0.21 | 42.50 ± 0.42 | 6.1 ± 0.5 |
| Comparative 1 | 5 | 5 | 10 | 3.25 ± 0.10 | 71.74 ± 0.44 | 2.29 ± 0.10 | 38.77 ± 1.85 | 6.6 ± 2.8 |
|  | 5 | 5 | 20 | 4.50 ± 0.11 | 88.90 ± 0.32 | 3.43 ± 0.09 | 50.91 ± 1.44 | 7.7 ± 0.2 |

FIG. 3

KIT FOR PRODUCING A POLYOLEFIN COMPOSITE

CROSS-REFERENCE TO RELATED APPLICATION

This application claims the benefit of priority of Singapore patent application no. 10201908204P filed on 5 Sep. 2019, the content of which is incorporated herein by reference in its entirety for all purposes.

TECHNICAL FIELD

Various embodiments relate to a kit for the preparation of a polyolefin composite and a method of preparing the polyolefin composite. Various embodiments also relate to a polyolefin composite obtained from the method as well as application of the polyolefin composite.

BACKGROUND

High performance polyolefin composites may be formulated using linker molecules, which are able to form a chemical bond with other precursor compounds of a matrix during the compounding process. However, if the components for their preparation are stored on the shelf, the chemical bond may be formed inadvertently and prematurely, resulting in a polyolefin composite at an undesired time, potentially spoiling the components. Moreover, since the polyolefin composite would be formed by an in situ reaction during compounding, some applications involving, for example, long fiber and continuous fiber processing, may not be feasible with such polyolefin composites. This is because in a traditional compounding, all active components are typically added at the same time at the start of the process. However, the addition of the long fiber and continuous fiber to the reaction tends to be more demanding, for example regarding the timing of the addition, which complicates reaction control.

Hence, there remains a need for improved storage means of the components and a method of preparing the polyolefin composite from those components that address or at least alleviate one or more of the above-mentioned problems.

SUMMARY

In a first aspect, there is provided a kit comprising a first component comprising a first polyolefin and a polymerizable epoxide resin, wherein the first polyolefin is a major phase of the first component, and a second component comprising a second polyolefin and a catalytic agent.

In a second aspect, there is provided a method of providing a polyolefin composite, the polyolefin composite comprising a first polyolefin, a polymerizable epoxide linker and a second polyolefin, the method comprising mixing a first component comprising a first polyolefin and a polymerizable epoxide resin, wherein the first polyolefin is a major phase of the first component; and a second component comprising a second polyolefin and a catalytic agent, to form a mixture, and processing the mixture to obtain the polyolefin composite.

In a third aspect, there is provided a polyolefin composite provided by the method as described in the second aspect.

In a fourth aspect, there is provided a polyolefin composite comprising a first polyolefin and a polymerizable epoxide linker and a second polyolefin provided by the kit as described in the first aspect.

In a fifth aspect, there is provided use of a polyolefin composite as described in the third aspect or in the fourth aspect in transportation, infrastructure, consumer goods, and/or construction.

BRIEF DESCRIPTION OF THE DRAWINGS

The invention will be better understood with reference to the detailed description when considered in conjunction with the non-limiting examples and the accompanying drawings, in which:

FIG. 1 is a table showing polyolefin composites prepared in accordance with the present disclosure (master batch resin compounding) and comparative examples (typical compounding), and a comparison of their mechanical properties.

FIG. 3 is a table showing polyolefin composites prepared in accordance with the present disclosure (master batch resin compounding) and comparative examples (typical compounding), and a comparison of their mechanical properties after leaving in air at room temperature for different duration.

DETAILED DESCRIPTION

Figure 2A:
FIG. 2A is a Field Emission Scanning Electron Microscope (FESEM) micrograph showing the morphology of a cracked surface of polypropylene (PP) composites (PP/10 wt % maleic anhydride-grafted polypropylene (MPP)/10 wt % glass fiber (GF)/10 wt % linker (LK)) prepared by traditional precursor blending. The scale bar represents a length of 10 μm.

Various embodiments disclosed herein are directed to a kit comprising a first component and a second component. The kit is described in at least one aspect of the present disclosure. For example, the kit is described at least in various embodiments of the first aspect.

Accordingly, in a first aspect, there is provided a kit comprising a first component comprising a first polyolefin and a polymerizable epoxide resin, wherein the first polyolefin is a major phase of the first component, and a second component comprising a second polyolefin and a catalytic agent. The polymerizable epoxide resin of the first component and the catalytic agent of the second component are configured to be reactive with each other. For example, the polymerizable epoxide resin and the catalytic agent may, if combined with each other, undergo a chemical reaction to form a covalent bond with each other. Such a reaction may preferably occur at temperatures higher than room temperature, however, a small percentage of the polymerizable epoxide resin and the catalytic agent may react with each other at room temperature, if not separated.

Advantageously, the active ingredients of the present disclosure, e.g. the polymerizable epoxide resin and the catalytic agent, are separated into two components of the kit: a first component, which may be composed of a first polyolefin and a polymerizable epoxide resin, and a second component, which may be composed of a second polyolefin and a catalytic agent. The purpose of component separation may be to prevent the chemical reaction before processing time. The shelf life of the first component and the second component have been investigated herein, wherein the kit of the present disclosure may be suitable and effective for wide ranges of polyolefin composites, enabling a prolonged shelf life of the components for a suitable time of processing. Furthermore, the separation of the active ingredients may allow for active ingredients with a higher reactivity to be used, since considerations of shelf life do not apply to the same extent. Moreover, higher concentrations of active ingredients may be considered, which is made possible due to the prevention of premature reaction. Accordingly and advantageously, the separation of the active ingredients may further allow for the preparation of a master batch. The master batch may further comprise a compatibilizer and a filler. The compatibilizer may form a strong interaction and good compatibility between the filler and the remaining components. For example, the first or the second component of the master batch may comprise a polymer having a functional group grafted thereon as a compatibilizer, which may react with the polymerizable epoxide resin or the catalytic agent. Such a strong bond formation may advantageously help to bridge polarity differences between the first or the second polyolefin, which is typically non-polar, and the filler, which is typically polar. By providing such a strong interaction across the polarities, this may enable usage of said filler to prepare high strength polyolefin composites. Accordingly, the master batch may further allow for a polyolefin composite to have a high filler content, retaining a high stability over time.

The use of the kit comprising the first component and the second component, each component comprising at least one active ingredient, whereby the active ingredients are configured to be reactive with each other, therefore possesses advantages over existing technologies wherein all compounds for the preparation of a polyolefin composite may be stored as a combination. This is because those compound combinations in existing technologies have a reduced shelf life, and due to the boundaries associated with their active ingredients not to be "too active", typically rely only on ineffective secondary interactions for obtaining compatibility across the various compounds of the ensuing polyolefin composite. Furthermore, due to the reactivity boundaries, the compound combinations may not allow for master batch usage. Separating the active ingredients in a kit provides therefore several advantages. The component separation not only allowed for a shelf life of the kit of up to 2 months without any significant performance deduction of the ensuing polyolefin composite, but at the same time, the separation allowed for a preparation as master batch in large scale, enhancing efficiency while reducing costs. Moreover, the component separation, and particularly preparation into a master batch, may facilitate reaction control during compounding, thus allowing the reaction to take place at a suitable time, thereby enabling applications involving, for example, long fiber and continuous fiber processing.

The first polyolefin in the first component is a major phase of the first component. "Major phase" in this context, refers to a majority content. Hence, the first polyolefin may be present in at least 50 wt % of the first component.

While the first polyolefin in the first component may be independent from the second polyolefin in the second component, various features describing the first polyolefin and the second polyolefin may be elaborated in the following jointly. Accordingly, in various embodiments, the first polyolefin may be present in the first component and/or the second polyolefin may be present in the second component independently at more than 50 wt %, at more than 60 wt %, at more than 70 wt %, at more than 80 wt %, optionally at more than 90 wt %, etc., of the respective first component and the second component.

In certain embodiments, the first polyolefin and/or second polyolefin independently may interact hydrophobically with the other compounds. However, the first polyolefin and/or the second polyolefin does not chemically react with the remaining compounds. In other words, the first polyolefin and/or second polyolefin, according to some embodiments, may not form a covalent bond with any other compound. Typically, a polyolefin is a non-polar, or hydrophobic material. Accordingly, the first polyolefin and/or second polyolefin may independently be an unsubstituted polyolefin. For example, the first polyolefin and/or second polyolefin may independently be an unsubstituted polyolefin, which only includes a polymeric backbone formed from polymerizing monomers of the polyolefin without any additional moieties grafted thereon.

According to various embodiments, the first polyolefin and/or second polyolefin may independently be selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the first polyolefin and/or second polyolefin may independently be selected from the group consisting of a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer. In certain embodiments, the first polyolefin and/or second polyolefin may independently be polyethylene. In certain embodiments, the first polyolefin and/or second polyolefin may independently be polypropylene, optionally in combination with a plastomer and/or elastomer, optionally selected from an ethylene-α-olefin copolymer. The ethylene-α-olefin copolymer may comprise a repeating unit derived from ethylene and a repeating unit derived from an α-olefin, optionally having 3 to 20 carbon atoms. In a non-limiting example, the first polyolefin and/or second polyolefin is independently polypropylene. Advantageously, a polyolefin composite comprising polypropylene may have the potential to replace engineering plastic.

In present context, the term "alkylene", alone or in combination, refers to an aliphatic hydrocarbon having one carbon-carbon double-bond. The alkylene may be linear or branched. In certain embodiments, an alkylene comprises 2 to 20 carbon atoms, such as 2 to 18, or 2 to 12, or 2-6 carbon atoms. "$C_{2-20}$ alkylene" means that an alkenyl group comprises only 2 carbon atoms, 3 carbon atoms, 4 carbon atoms, 5 carbon atoms, 6 carbon atoms, 7 carbon atoms, 8 carbon atoms, 9 carbon atoms, 10 carbon atoms, 11 carbon atoms, 12 carbon atoms, 13 carbon atoms, 14 carbon atoms, 15 carbon atoms, 16 carbon atoms, 17 carbon atoms, 18 carbon atoms, 19 carbon atoms, or 20 carbon atoms. Examples of alkylenes include, but are not limited to, ethenyl, propenyl, butenyl, 1,4-butadienyl, pentenyl, hexenyl, 4-methylhex-1-enyl, 4-ethyl-2-methylhex-1-enyl and the like.

The term "linear", as used herein, refers to each of the carbon atom backbone chains having no branch point. The term "branched" means a chain of atoms with one or more side chains attached to it. Branching occurs by the replacement of a substituent, e.g. a hydrogen atom, with a covalently bonded substituent or moiety, e.g. an alkyl group.

In various embodiments, the first polyolefin and/or the second polyolefin may independently have a melt flow rate of about 5 g/10 min to about 200 g/10 min, optionally of about 5 g/10 min to about 100 g/10 min, optionally of about 10 g/10 min to about 90 g/10 min, optionally of about 15 g/10 min to about 80 g/10 min, optionally of about 20 g/10 min to about 70 g/10 min, optionally of about 25 g/10 min to about 60 g/10 min, optionally of about 30 g/10 min to about 80 g/10 min, optionally of about 20 g/10 min to about 50 g/10 min, etc., whereby the melt flow rate may be measured at a temperature of 230° C. at a weight of 2.16 kg. Such ranges of melt flow rate are advantageously suitable for further processing (e.g., injection, pultrusion, lamination) of the first component and/or the second component.

The first component may further comprise a polymerizable epoxide resin. "Polymerizable epoxide resin", in that context, refers to a monomer, oligomer or polymer, or any combination thereof, that further comprises an epoxide being configured to covalently bond with the catalytic agent. Advantageously, the polymerizable epoxide resin has a substantially high reactivity towards the catalytic agent, which enables a strong covalent bond to be formed upon preparation of the polyolefin composite. This high reactivity may be provided by the epoxide, being the functionality that reacts with the catalytic agent in a ring-opening reaction. The high reactivity, in turn, may result in a stronger adherence of the polymerizable epoxide resin with the catalytic agent. More advantageously, due to the covalent bond formation of the epoxide with the catalytic agent, addition of reinforcement agents, such as, for example, a filler, is enabled without sacrificing on stability of the ensuing polyolefin composite.

According to various embodiments, the polymerizable epoxide resin may be present at an amount greater or equal to 0.1 wt % and up to 50 wt %, optionally at an amount greater or equal to 0.1 wt % and less than 20 wt %, optionally at an amount greater or equal to 0.1 wt % and less than 15 wt %, optionally at an amount greater or equal to 5 wt % and less or equal to 15 wt %, optionally at an amount greater or equal to 0.1 wt % and less than 10 wt %, etc., based on the weight of the first component. Such weight percentage ranges of the polymerizable epoxide resin improve reactivity between the polymerizable epoxide linker and the remaining components of the kit, as for example, if present, the filler. Moreover, the higher limits of the weight percentage ranges may still be sufficiently low to ensure homogeneity within the first component.

According to various embodiments, the polymerizable epoxide resin may be selected from the group consisting of an epoxy-containing monomer, an epoxy-containing oligomer, an epoxy-containing polymer and a combination thereof.

According to various embodiments, the polymerizable epoxide resin may be a glycidyl ether epoxy resin which may be obtained by a reaction between an allylic phenyl derivative and an epoxide-containing precursor, wherein the allylic phenyl derivative may be selected from the group consisting of ortho-allyl phenolic novolak and diallyl bisphenol compound having an allyl group in the ortho position of bisphenol A with respect to the hydroxyl group.

According to various embodiments, the polymerizable epoxide resin may be obtained by a reaction between a hydroxy derivative and an epoxide-containing precursor, wherein the hydroxy derivative may be selected from the group consisting of bisphenol, resorcinol, dihydroxynaphthalene, trihydroxynaphthalene, dihydroxybiphenylfluorene, trishydroxylmethane, tetrakishydroxyphenylethane, novolak, phenol, and a combination thereof.

According to various embodiments, the polymerizable epoxide resin may be obtained by a reaction between an amine and an epoxide-containing precursor, wherein the amine may be selected from the group consisting of tetraglycidyldiaminodiphenylmethane, aminophenol, aminocresol, xylenediamine, and a combination thereof.

According to various embodiments, the polymerizable epoxide resin may be obtained by a reaction between an aromatic, aliphatic or alicyclic carboxylic acid and an epoxide-containing precursor. The epoxide-containing precursor may be selected from the group consisting of epichlorohydrin, ethylene oxide, propylene oxide, styrene oxide, cyclohexene oxide, phenyl glycidyl ether, and a combination thereof.

According to various embodiments, the polymerizable epoxide resin may be selected from the group consisting of bisphenol A epoxy resin, bisphenol S epoxy resin, bisphenol K epoxy resin, bisphenol F epoxy resin, phenolic novolak epoxy resin, cresol novolak epoxy resin, acyclic epoxy resin, heterocyclic epoxy resin, hydrogenated bisphenol A epoxy resin, aliphatic epoxy resin, and a combination thereof.

According to various embodiments, the heterocyclic epoxy resin may be selected from the group consisting of triglycidyl isocyanuric epoxy, hydantoin epoxy, and a combination thereof.

According to various embodiments, the aliphatic epoxy resin may be selected from the group consisting of propylene glycol-diglycidyl ether, pentaerythritolpolyglycidyl ether, and a combination thereof.

According to various embodiments, the polymerizable resin may comprise a spiro ring.

According to various embodiments, the first component and/or the second component may further comprise a polymer having a functional group grafted thereon. The functional group grafted on the polymer is configured to react with the epoxide of the polymerizable epoxide resin. When a polymer having a functional group grafted thereon is provided, this polymer may react with the polymerizable epoxide resin to form a further covalent bond. This chemical bond formed between the polymerizable epoxide resin and the polymer having a functional group grafted thereon may be an ester bond. The ester bond may be formed, for example, by a reaction between an anhydride and an epoxide.

Advantageously, the polymer having a functional group grafted thereon may have a substantially non-polar polymer backbone and a substantially polar moiety being grafted therein. Hence, it acts as a compatibilizer to enhance polar and non-polar interactions between the first and/or the second polyolefin and the remaining more polar compounds within the ensuing polyolefin composite. For example, the substantially non-polar polymer backbone of the polymer having a functional group grafted thereon may form hydrophobic interactions with the polyolefin, while the covalent bond of the polymer having a functional group grafted thereon, that is formed with the polymerizable epoxide resin, may provide a strong connection to the polar components within the ensuing polymer composite.

In embodiments wherein a filler is present, due to the enhanced interaction with the polymerizable epoxide resin, addition of the polymer having a functional group grafted thereon may result in improved strength and better dispersion of the filler within the ensuing polyolefin composite. Further advantageously, the polymer having a functional group grafted thereon may have a substantially non-polar polymer backbone and a substantially polar functional group being grafted therein. Hence, it can act as a compatibilizer to enhance polar and non-polar interactions between the polyolefin and the remaining more polar components, for example the filler, within the polyolefin composite.

In certain embodiments, the polymer having a functional group grafted thereon may be a third polyolefin having a functional group grafted thereon. Advantageously, when the polymer of the polymer having a functional group grafted thereon is a third polyolefin, the hydrophobic interaction between the first polyolefin, the second polyolefin and the third polyolefin having a functional group grafted thereon may be particularly stronger, since the first polyolefin, the second polyolefin and the third polyolefin can have approximately equal polarity. The stronger hydrophobic interaction may result in an even stronger adherence of the three materials via secondary interactions.

In various embodiments, the third polyolefin may be selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the third polyolefin may be selected from a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer.

In certain embodiments, the third polyolefin may be a polypropylene. Advantageously, when the first polyolefin, the second polyolefin and the third polyolefin are polypropylene, the hydrophobic interaction between the first polyolefin, the second polyolefin and the third polyolefin having a functional group grafted thereon may be particularly stronger, since the various polypropylenes can have approximately equal polarity. The stronger hydrophobic interaction may result in an even stronger adherence of the three materials via secondary interactions.

According to various embodiments, the functional group grafted on the polymer may comprise a —COO— group, which forms the chemical bond with the polymerizable epoxide resin. Such a functional group may be present, for example, in an acid, an ester, an anhydride, and a lactone. A —COO— group generally refers to a carbon atom with a double bond to one oxygen atom and a single bond to a second oxygen atom.

According to various embodiments, the functional group comprising the —COO— group of the polymer may be an anhydride. Accordingly, the polymer having a functional group grafted thereon may be an anhydride-grafted polymer. Accordingly, in certain embodiments, the functional group comprising the —COO— group may be an anhydride selected from the group consisting of maleic anhydride, succinic anhydride, citraconic anhydride, endo-bi-cyclo[2,2,1]-1,4,5,6,7,7-hexa-chloro-5 heptene-2,3-dicarboxylic acid anhydride, endo-bi-cyclo[2,2,1]-5-heptene-2,3-dicarboxylic acid anhydride, cis-4-cyclohexene-1,2-dicarboxylic acid anhydride, and a combination thereof. As a non-limiting example, the functional group comprising the —COO— group is maleic anhydride. Accordingly, as a non-limiting example, the polymer having a functional group grafted thereon is maleic-anhydride-grafted polypropylene.

According to various embodiments, the polymer having a functional group grafted thereon may further comprise a moiety selected from the group consisting of a hydroxyl, a carboxylic acid, a carboxylate, methyl acrylate, methyl methacrylate, ethyl acrylate, ethyl methacrylate, butyl acrylate, butyl methacrylate, maleate monoester, maleate diester, and a combination thereof.

The second component of the kit may comprise a catalytic agent. "Catalytic agent" as used herein may refer to an agent which is capable of initiating a reaction. In this context, the catalytic agent is capable of initiating a reaction with the polymerizable epoxy resin. The initiating capacity in the catalytic agent may be an electron-rich atom, such as an amine functionality. The reaction initiated by the catalytic agent may be a nucleophilic substitution. For example, an amine may react with an epoxide in a ring-opening nucleophilic substitution reaction, which may result in polymerisation of the polymerizable epoxy resin.

Accordingly, in various embodiments, the catalytic agent may be capable of initiating polymerisation of the polymerizable epoxide resin. Particularly, the catalytic agent may comprise an amine functionality, which is capable of initiating polymerisation of the polymerizable epoxide resin. In certain embodiments, the catalytic agent may comprise a monoamine, a diamine, a triamine, a polyamine, an imidazole, a tertiary amine, a secondary amine, an organic acid hydrazide, or a combination thereof.

In various embodiments, the catalytic agent may be present at an amount greater or equal to 0.1 wt % and less than 30 wt %, optionally at an amount greater or equal to 0.1 wt % and less than 10 wt %, optionally at an amount greater or equal to 1 wt % and less than or equal to 10 wt %, etc., based on the weight of the second component. Such amounts of the catalytic agent improve reactivity between the polymerizable epoxide resin and the catalytic agent, and may ensure completion, or substantial completion of the reaction.

In various embodiments, the catalytic agent may further comprise an aliphatic component, an aromatic component, or a combination thereof. In various embodiments, the catalytic agent may comprise an anhydrous compound which is capable of initiating polymerization of the polymerizable epoxide resin, which may further comprise an aliphatic component, an aromatic component, or a combination thereof. In various embodiments, the catalytic agent may comprise a triaryl sulfonium salt, a dicyanamide, a boron trifluoride-amine complex, a polymercaptan, a polyamide resin, or a combination thereof.

In various embodiments, the first component and/or the second component may further comprise an additive selected from the group consisting of an ultraviolet stabilizer, an antioxidant, a pigment and a combination thereof. The ultraviolet stabilizer and/or the antioxidant may be selected from the group consisting of a hindered phenol, phosphite, thioether, benzophenone, benzotriazole, and a combination thereof.

In various embodiments, the first component and/or the second component may further comprise a styrene-based polymer. The styrene-based polymer may also be termed a minor phase resin. The styrene-based polymer may be selected from the group consisting of polystyrene, styrene-acrylonitrile resin, and a combination thereof.

According to certain embodiments, the first component and/or the second component may further comprise a filler. The filler may be present in a weight percentage range of up to about 90 wt %, up to about 70 wt %, up to about 50 wt %, up to about 30 wt %, up to about 20 wt %, up to about 10 wt %, or between about 0.1 wt % and about 90 wt %, or between about 1 wt % to about 70 wt %, or between about 5 wt % to about 30 wt %, or between about 10 wt % to about 20 wt %, or between about 10 wt % to about 30 wt %, or between about 10 wt % to about 50 wt %, or between about 1 wt % and about 60 wt %, or between about 0.1 wt % and about 40 wt %, or between about 0.1 wt % and about 30 wt %, or between about 5 wt % and about 10 wt %, etc., based on the weight of the first component and/or the second component. The weight percentage ranges of the filler may be used to influence the mechanical properties of the polyolefin composite.

The term "filler" according to the present disclosure refers to any material that may be used to reinforce the polyolefin composite and having a maximal dimension of about 0.1 µm to about 10,000 µm. By the term "maximal dimension", it refers to a size of the filler, as measured by its largest dimension in any direction. In various embodiments, the filler exists in discrete form, and is dispersed in the matrix. In various embodiments, the filler may have a size of about 0.1 µm to about 1000 µm, or about 0.1 µm to about 800 µm, or about 0.1 µm to about 500 µm, or about 0.1 µm to about 100 µm, or about 1 µm to about 1000 µm, or about 1 µm to about 100 µm, or about 100 µm to about 800 µm, or about 200 µm to about 700 µm, or about 300 µm, or about 650 µm, etc. Such sizes of the filler may be used to influence the mechanical properties of the polyolefin composite. The filler may be added in an amount between about 1 wt % to about 80 wt %, optionally in an amount between about 10 wt % to about 60 wt %, etc., based on the weight of the first component, the second component, or both the first component and the second component.

In various embodiments, the filler may be selected from the group consisting of a microfiller, a continuous fiber, a highly dispersed nanofiller, and a combination thereof. Particularly, a material of the microfiller may be selected from the group consisting of metal, polymeric material, metal oxide, clay, glass, carbon, cellulose, and a combination thereof. In various embodiments, the microfiller may have a size of about 0.1 µm to about 50 mm, or of about 1 µm to about 50 mm, or of about 0.1 µm to about 20 mm, or of about 1 µm to about 20 mm, or of about 10 µm to about 50 mm.

In various embodiments, a material of the continuous fiber may be selected from the group consisting of glass fiber, carbon fiber, hybrid fiber, synthetic fiber, natural fiber, ceramic fiber, metallic fiber, and a combination thereof.

In various embodiments, a material of the highly dispersed nanofiller may be selected from the group consisting of inorganic silicate, alumino silicate, pellet-like metal oxide and hydroxide, anionic and cationic layered metal oxide and hydroxide, montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered metal oxide, layered metal hydroxide, attapulgite (AT), and a combination thereof. Particularly, the inorganic silicate may be calcium silicate. The highly dispersed nanofiller may comprise metal oxide and/or metalloid oxide. The metal oxide and/or metalloid oxide may be selected from the group consisting of $SiO_2$, $TiO_2$, $ZnO$, $CaO$, $Al_2O_3$, $Fe_2O_3$, and a combination thereof.

In various embodiments, the highly dispersed nanofiller may be modified with an organosilane. Particularly, the organosilane may comprise an active functional group selected from the group consisting of octyl, amine, vinyl, hydroxyl, thiol, and a combination thereof.

In a second aspect, there is provided a method of providing a polyolefin composite, the polyolefin composite comprising a first polyolefin, a polymerizable epoxide linker and a second polyolefin, the method comprising mixing a first component comprising a first polyolefin and a polymerizable epoxide resin, wherein the first polyolefin is a major phase of the first component; and a second component comprising a second polyolefin and a catalytic agent, to form a mixture, and processing the mixture to obtain the polyolefin composite.

Embodiments and advantages described for the kit of the first aspect can be analogously valid for the method of the second aspect, and vice versa. As the various embodiments and advantages have already been described above and examples demonstrated herein, they shall not be iterated for brevity where possible.

Advantageously, during the processing to obtain the polyolefin composite from the first component and the second component, the polymerizable epoxide resin and the catalytic agent, optionally the polymer having a functional group grafted thereon, may react with each other to form covalent bonds with each other. Thus, the polymerizable epoxide resin and the catalytic agent, optionally the polymer having a functional group grafted thereon may be seen to be precursor for those new compounds. Accordingly, the polyolefin composite as produced herein may comprise a polymerizable epoxide linker. "Polymerizable epoxide linker", in that context, refers to a monomer, oligomer or polymer, or any combination thereof, that further comprises a functionality that is derived from an epoxide and reacted to be covalently bonded to the catalytic agent. Additionally or alternatively, the functionality that is derived from an epoxide may be reacted to be covalently bonded to the polymer having a functional group grafted thereon grafted thereon, if present. Advantageously, the polymerizable epoxide linker may have a substantially polar chemical nature, which creates a strong hydrophilic interaction with a filler, if present. This, in turn, may result in a stronger adherence of the two materials. More advantageously, due to the covalent bond with the polymer having a moiety grafted thereon, the polymerizable epoxide linker acts as a linking element, linking the polymer having a moiety grafted thereon, and thereby also the polyolefin, to the filler to be well dispersed. The polar chemical nature of the polymerizable epoxide linker may be due to polar components of polymerizable epoxide linker, such as ether bonds, phenyl rings, or a combination thereof.

According to various embodiments, the polymerizable epoxide linker may be derived from the polymerizable epoxy resin, optionally selected from the group consisting of an epoxy-containing monomer, an epoxy-containing oligomer, an epoxy-containing polymer and a combination thereof. While the catalytic agent may be present in the second component, during processing, it may be consumed.

The method may further comprise adding a filler to the mixture.

In various embodiments, the method may further comprise adding a further polyolefin to the mixture, optionally in an amount greater or equal to 20 wt % and less than 99 wt %, optionally in an amount greater or equal to 40 wt % and less than 60 wt %, etc., based on the weight of the first component, the second component, or both the first component and the second component. Such amounts of the further polyolefin may be used to adjust the composition of the polyolefin composite to its target application.

In various embodiments, the method may further comprise adding a polymer having a functional group grafted thereon to the mixture, optionally in an amount greater or equal to 0.1 wt % and less than 20 wt %, optionally in an amount greater or equal to 1 wt % and less than 10 wt %, etc., based on the weight of the first component, the second component, or both the first component and the second component. Such amounts of the polymer having a functional group grafted thereon improve reactivity between the polymer having a functional group grafted thereon and the polymerizable epoxide linker.

In various embodiments, the first component and the second component may be mixed in a wt % ratio from about 1:1 to about 5:1, or from about 1:1 to about 4:1, or from about 1:1 to about 3:1, or from about 1:1 to about 2:1. Such weight percentage ratios between the first component and the second component facilitate reaction efficiency, and/or may result in desired mechanical properties of the polyolefin composite.

In various embodiments, mixing the first component and the second component may be carried out in a mixer or a drum tumbler.

In various embodiments, processing the mixture may comprise physically agitating the mixture in a mixer, a roller, a twin extruder, or a combination thereof. Particularly, processing may comprise melt-mixing the mixture. Advantageously, melting the mixture may comprise formation of the chemical bond between the polymerizable epoxy resin and the catalytic agent, or optionally between the functional group of the polymer having a functional group grafted thereon and the polymerizable epoxy resin and the catalytic agent.

In a third aspect, there is provided a polyolefin composite provided by the method as described above.

In a fourth aspect, there is provided a polyolefin composite comprising a first polyolefin, a polymerizable epoxide linker and a second polyolefin provided by the kit as described above.

Embodiments and advantages described for the kit of the first aspect or the method of the second aspect, can be analogously valid for the polyolefin composite of the third and the fourth aspect, and vice versa. As the various embodiments and advantages have already been described above and examples demonstrated herein, they shall not be iterated for brevity where possible.

According to various embodiments of the third and the fourth aspect, the first polyolefin, the second polyolefin and the further polyolefin, when present, may be collectively present at about 40 wt % to about 99.9 wt %, or at about 50 wt % to about 90 wt %, or at about 60 wt % to about 80 wt %, or at about 70 wt % to about 95 wt %, etc., based on the total weight of the polyolefin composite. Such weight percentage ratios may be adapted depending on the target application of the polyolefin composite.

According to various embodiments of the third and the fourth aspect, the polymerizable epoxide linker may be present at about 0.1 wt % to about 30 wt %, or at about 0.5 wt % to about 20 wt %, or at about 1 wt % to about 10 wt %, or at about 5 wt % to about 15 wt %, etc., based on the total weight of the polyolefin composite. Such weight percentage ranges of the polymerizable epoxide linker, in particular their higher limits, may still be sufficiently low to ensure homogeneity within the first component.

According to various embodiments of the third and the fourth aspect, the additive, when present, may be present at about 0.01 wt % to about 1 wt %, or at about 0.1 wt % to about 0.5 wt %, or at about 0.2 wt % to about 0.4 wt %, etc., based on the total weight of the polyolefin composite. Such weight percentage ranges advantageously protect the polymer composite from degradation during processing.

According to various embodiments of the third and the fourth aspect, the polymer having a functional group grafted thereon, when added to the mixture, is present at about 0.1 wt % to about 50 wt %, or at about 0.5 wt % to about 10 wt %, or at about 1 wt % to about 5 wt %, etc., based on the total weight of the polyolefin composite.

According to various embodiments of the third and the fourth aspect, the first component and the second component may be present at about 0.1 wt % to about 20 wt %, or at about 0.5 wt % to about 15 wt %, or at about 1 wt % to about 10 wt %, or at about 5 wt % to about 25 wt %, etc., based on the total weight of the polyolefin composite. Such weight percentage ranges of the first component and the second component are suitable for interaction, optionally reaction, with the filler.

According to various embodiments of the third and the fourth aspect, the microfiller, when present, may be present at about 1 wt % to about 70 wt %, or at about 10 wt % to about 60 wt %, or at about 5 wt % to about 50 wt %, or at about 15 wt % to about 40 wt %, etc. based on the total weight of the polyolefin composite. The weight percentage range of the microfiller may be used to influence the mechanical properties of the polyolefin composite.

According to various embodiments of the third and the fourth aspect, the continuous fiber, when present, may be present at about 1 wt % to about 80 wt %, or at about 5 wt % to about 70 wt %, or at about 10 wt % to about 60 wt %, or at about 15 wt % to about 50 wt %, etc., based on the total weight of the polyolefin composite. The weight percentage range of the fiber may be used to influence the mechanical properties of the polyolefin composite.

In a fifth aspect, there is provided use of a polyolefin composite as described in the third and the fourth aspect in transportation, infrastructure, consumer goods, and/or construction. The use in transportation may be selected from the group consisting of aerospace, automotive, train, and a combination thereof. The use in infrastructure may be selected from the group consisting of pipe, tank, and a combination thereof. The use in consumer goods may be selected from the group consisting of packaging, sporting goods, electronics, and a combination thereof. Embodiments and advantages described for the kit of the first aspect or the method of the second aspect or for the polyolefin composite of the third and the fourth aspect can be analogously valid for the use of the polyolefin composite of the fifth aspect, and vice versa. As the various embodiments and advantages have already been described above and examples demonstrated herein, they shall not be iterated for brevity where possible.

The present disclosure relates to a kit, which minimizes the problems mentioned above. The present disclosure involves the active components as two parts: part A (which is composed of polyolefin and epoxide compound) and part B (which is composed of polyolefin and catalytic compound). The purpose of component separation is to prevent the chemical reaction before processing time. The efficiency and shelf life of part A and part B has been investigated. The disclosure is suitable and effective for wide ranges of polyolefin composites and it can prolong the shelf life of the composites for the suitable time of processing.

The disclosure illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

"About", as used herein, refers to the numerical value it relates to ±10%.

Hereinafter, the present disclosure will be described more fully with reference to the accompanying drawings, in which exemplary embodiments of the disclosure are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

EXPERIMENTAL SECTION

The kit comprising a first component comprising a first polyolefin and a polymerizable epoxide resin, and a second component comprising a second polyolefin and a catalytic agent according to the present disclosure results in a preparation kit having a prolonged shelf life and allowing for master batch processing as well as reinforcement filler. This object is achieved via separation of the active ingredients into a first component and a second component. The in-situ curing reaction between the active ingredients may take place during the preparation of the polyolefin composite and not on the shelf.

Materials: The polyolefin usable in the composition of this disclosure includes the wide range of polyolefin i.e., low density polyethylene, linear low density polyethylene, medium and high density polyethylene, polypropylene, poly-1-butene, poly-4-methyl-1-pentene, ethylene-propylene block or random copolymer, ethylene-1-butene copolymer, propylene-1-butene copolymer, and mixtures thereof. These polyolefins preferably have an MFR of 5 to 50 at 230° C., 2.16 kg.

The polymerizable epoxy resin may be an epoxy-containing monomer, oligomer, polymer or any combination thereof. The epoxy may also be of the bisphenol A type epoxy resin, bisphenol S type epoxy resin, bisphenol K type epoxy resin, bisphenol F type epoxy resin, phenolic novolak type epoxy resin, cresol novolak type epoxy resin, alicyclic epoxy resin, heterocyclic epoxy resins (such as triglycidyl isocyanuric and hydantoin epoxy), hydrogenated bisphenol A type epoxy resin and aliphatic epoxy resins (such as propylene glycol-diglycidyl ether and pentaerythritolpolyglycidyl ether). The bonding process may be obtained by the reaction between an aromatic, aliphatic or alicyclic carboxylic acid and epichlorohydrin. The epoxy binder may have a spiro ring, a glycidyl ether type epoxy resin which may be obtained by the reaction between ortho-allyl phenolic novolak compound and epichlorohydrin. The epoxy binder may be of a glycidyl ether type epoxy resin which may be obtained by the reaction between diallyl bisphenol compound having an allyl group in the ortho site of bisphenol A with respect to the hydroxylgroup and epichlorohydrin. The epoxy binder may be obtained by the reaction between a phenol and an epichlorohydrin in which the reactants may be bisphenols (such as bisphenol A and bisphenol F), resorcinol, dihydroxynaphthalene, trihydroxynaphthalene, dihydroxybiphenylfluorene, trishydroxylmethane, tetrakishydroxphenlyl ethane, novolaks, condensates of dicyclopentadiene, phenols, or a combination thereof. The epoxy binder may be obtained by the reaction between amines and epichlorohydrin in which the reactants may be tetraglycidyldiaminodiphenylmethane, aminophenol, aminocresol and xylenediamine, or a combination thereof. In addition, derivatives such as ethylene oxide, propylene oxide, styrene oxide, cyclohexene oxide or phenyl glycidyl ether, or a combination thereof, may be used as desired. These epoxy materials can be used singly or in the form of a mixture of at least two kinds of the epoxy resins. In one embodiment, the epoxy matrix material may be an aliphatic, cycloaliphatic or aromatic epoxy resin which has a plurality of epoxide groups. The epoxy resin may have two epoxide groups such as diglycidyl ether of bisphenol A.

The catalytic agent may be a compound of monoamine, diamine, tri-amine, or polyamine with an aliphatic and/or aromatic component. The catalytic agent may be a compound of aliphatic, aromatic and/or alicyclic anhydrous compounds. The catalytic agent may be a compound of aliphatic, aromatic and/or alicyclic anhydrous compounds. The catalytic agent may be a compound of organic-acid hydrazide, triaryl sulfonium salt, dicyandiamide, boron trifluoride-amine complex, polymercaptan, imidazoles, tertiary amines, secondary amines, and/or polyamide resin.

Methodology: In one example, a master batch resin was composed of two parts:

a) Part A, composed of polyolefin base as major resin phase, linker components, additives, and/or minor phase polymer resin;

b) Part B, composed polyolefin base as major resin phase, catalytic components, additives, and/or minor phase polymer resin.

The composition in each part was mixed using high speed mixer. The mixing process was carried out for a period of time of between 1 and 10 minutes and at a high mixing speed of between 50 and 1000 rpm. After mixing, the mixture was compounded by twin screw extruder. Twin screw extruder was used in this disclosure to effectively provide the high shear rate and distribution required for uniform blending. The twin screw L/D ratio, screw configurations, extrusion time, extrusion speed, extrusion temperature and other extrusion conditions can be suitably selected depending on the particular purposes. The blending process was performed in the range of 130 to 180° C. The L/D ratio of screw was preferred from 16 to 40. The rotor speed was set between 50 and 400 rpm. The range of polymerizable epoxy resin and catalytic agent in weight percentage was 1-30 wt % and 1-15 wt %, respectively.

Performance testing: The performance of the master batch resin was evaluated via mechanical test according to ASTM D790, ASTM D256 and ASTM D638. The composition of the disclosure can be prepared by mixing each component using a Henschel mixer or drum tumbler, and then melting and kneading the mixture using a Banbury mixer, rolls, a twin extruder, or the like. However, the disclosure is not limited to these methods. Stabilizers such as antioxidants and ultraviolet ray absorbers, and additives such as slipping agents, antistatic agents, and pigments may be further added to the polyolefin composite. The polyolefin composite of this disclosure is superior in mold ability and demold ability in injection molding; and it can be also used for extrusion molding.

Characterization:

Field Emission Scanning Electron Microscope (FESEM) micrographs were taken using FESEM, JEOL-6700F conducted in high resolution mode with a large objective aperture at 200 kV.

Mechanical Property: The flexural modulus was determined by 3-point bending test according to the ASTM Standard D 790-96. The injection molded sample has a specimen size of 100×10×1 mm$^3$. The tests were conducted with crosshead speed of 1 mm/min, at a span length of 25.4 mm.

The injection molded sample for tensile test was carried out according to ASTM D 638-03. The Type V dimension was 63.5×3.14×3.2 mm$^3$. The test was carried out using the Instron 5569 Table Universal testing machine at tensile speed of 1 mm/min. The impact strength was determined by an Izod impact test according to ASTM Standard D 256. The injection molded sample has a specimen size of 63.5×12.7×3.2 mm$^3$. The test was carried out using Zwick Roell HIT25P with a 1 Joule pendulum load.

Example 1

Part A (90.7 wt % polypropylene (PP)+9.3 wt % linker (LK)) was physically mixed with Part B (94.4 wt % polypropylene (PP)+3.6 wt % catalytic agent (CA)), 5 wt % MPP and 10 or 20 wt % long chopped glass fiber (GF). The total composition of composite is 80 wt % PP/5 wt % MPP/5 wt % LK/10 wt % GF and 70 wt % PP/5 wt % MPP/5 wt % LK/20 wt % GF.

Comparative Example

Polypropylene was mixed with maleic anhydrous grafted polypropylene with 5% by weight of the total mixture. The epoxide linker content was about 5% by weight of the total mixture In addition, the PP compound also contained the long chopped glass fiber with 10% and 20% by weight of the total mixture. The compound was prepared by mixing each component directly in extruder.

Results

Figure 2B:
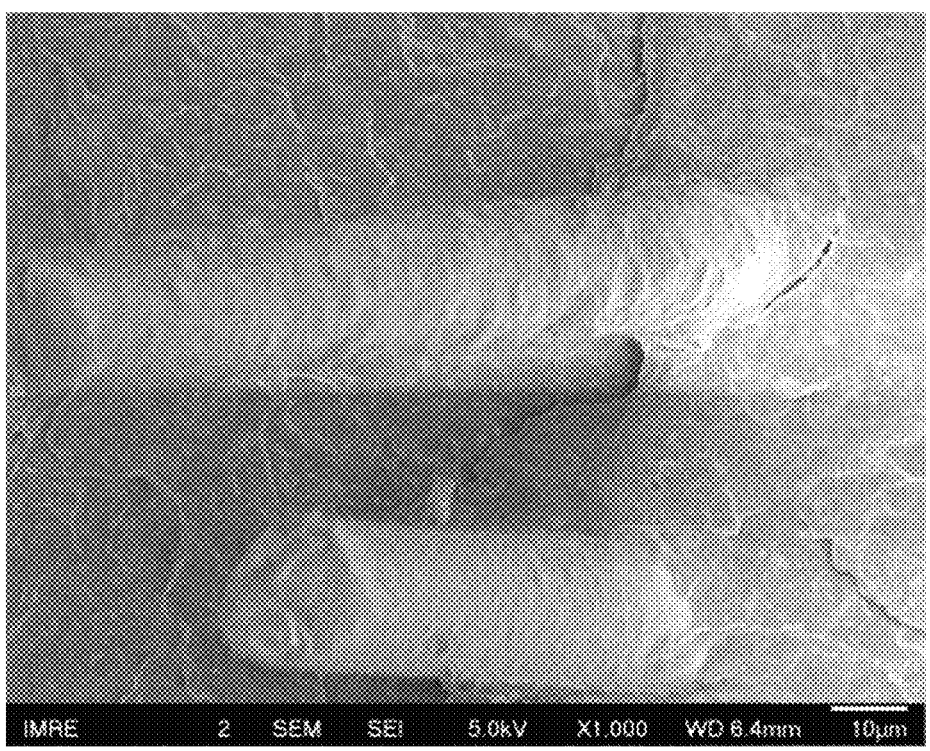
FIG. 2B is a FESEM micrograph showing the morphology of a cracked surface of PP composites (PP/10 wt % MPP/10 wt % GF/10 wt % LK) prepared by master batch blending according to the present disclosure. The scale bar represents a length of 10 μm.
Figure 4A:
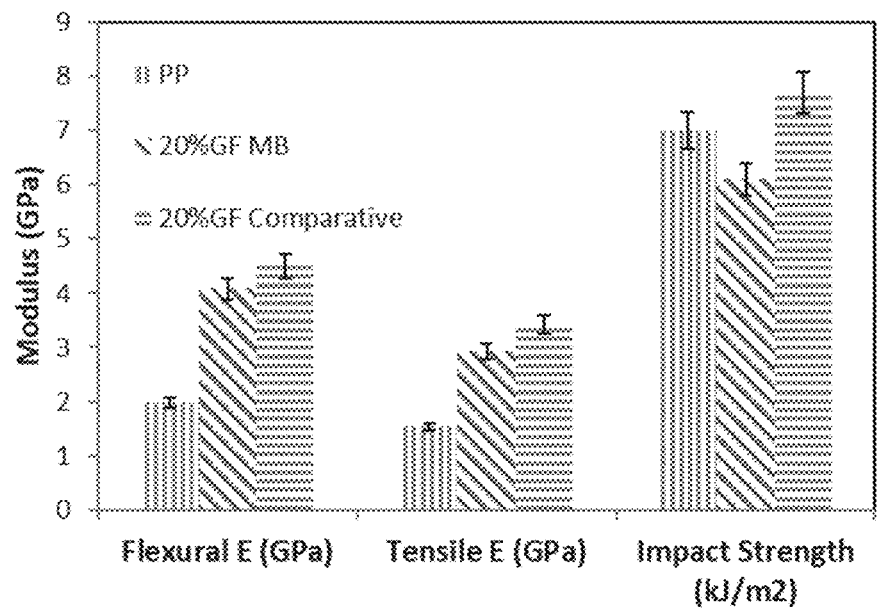
FIG. 4A is a graph showing polyolefin composites prepared in accordance with the present disclosure (master batch resin compounding), comparative examples (typical compounding and a polypropylene composition) and a comparison of their mechanical properties of the Modulus. The testing standard used is as follows: Flexural (ASTM D 790-96), Tensile (ASTM 638-03) Impact (ASTM Standard D 256). The mechanical properties of PP composites prepared by typical blending and master batch blending are slightly different (<5%), except impact strength.
Figure 4B:
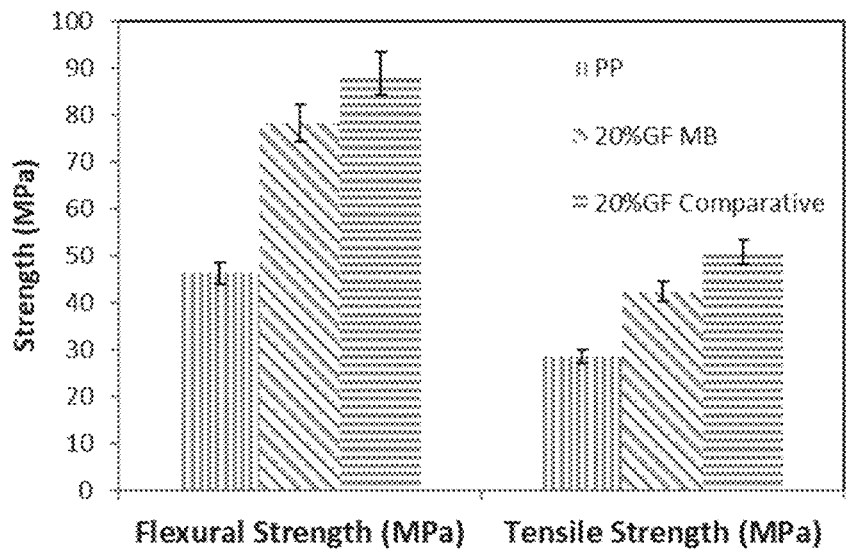
FIG. 4B is a graph showing polyolefin composites prepared in accordance with the present disclosure (master batch resin compounding), comparative examples (typical compounding and a polypropylene composition) and a comparison of their mechanical properties of their strength. The testing standard used is as follows: Flexural (ASTM D 790-96), Tensile (ASTM 638-03) Impact (ASTM Standard D 256). The mechanical properties of PP composites prepared by typical blending and master batch blending are slightly different (<5%), except impact strength.
Figure 5A:
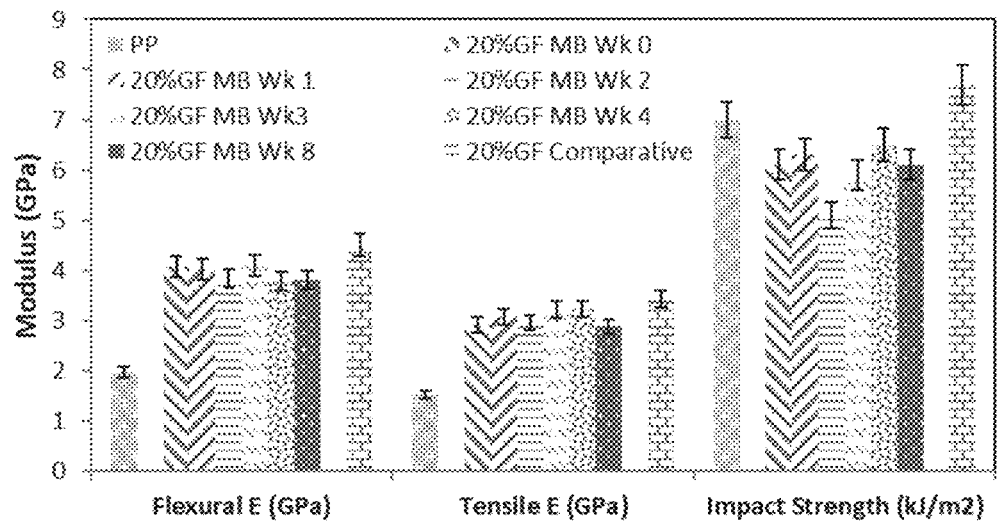
FIG. 5A is a graph showing polyolefin composites prepared in accordance with the present disclosure (master batch resin compounding), comparative examples (typical compounding and a polypropylene composition) and a comparison of their mechanical properties of the Modulus after leaving in air at room temperature for different duration. The testing standard used is as follows: Flexural (ASTM D 790-96), Tensile (ASTM 638-03) Impact (ASTM Standard D 256). The master batch is relatively stable up to two months, and is suitable for engineering applications.
Figure 5B:
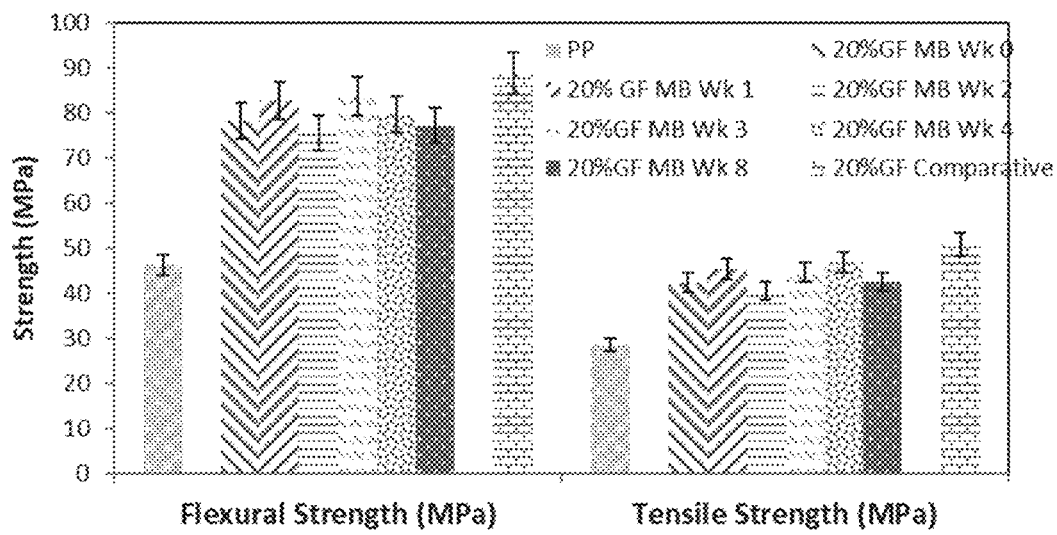
FIG. 5B is a graph showing polyolefin composites prepared in accordance with the present disclosure (master batch resin compounding), comparative examples (typical compounding and a polypropylene composition) and a comparison of their mechanical properties of the Strength after leaving in air at room temperature for different duration. The testing standard used is as follows: Flexural (ASTM D 790-96), Tensile (ASTM 638-03) Impact (ASTM Standard D 256). The master batch is relatively stable up to two months, and is suitable for engineering applications.

FIG. 1 shows the mechanical properties of PP composites prepared using traditional resin compounding and master batch resin compounding. The results show that the mechanical properties of the PP composites prepared using master batch resin are retained, except for a minor, insignificant drop (about 5-10%, as compared to the PP composite prepared using traditional method). This drop may be possible due to an incomplete reaction of the linker molecule. However, a comparison between FIGS. 2A and 2B clearly shows that the morphology of the PP composite prepared by traditional extrusion blending and the master batch blending is similar. The filler and matrix adheres strongly to each other due to the chemical reaction via linker molecule. This result suggests that the master batch resin can provide the polyolefin composite with similar performance and morphology as polyolefin composite prepared by a traditional process. In addition, FIG. 3 shows the stability of the master batch resin, tested up to two months. The master batch resin was left in the air at room temperature (~27° C.) for different duration (i.e., 1, 2, 3, 4 and 8 weeks) before compounded with other components. The result clearly shows that the mechanical performance the PP composite is relatively consistent, suggesting the good stability of the master batch resin. FIG. 4A and FIG. 4B are graphs illustrating the results of the Table of FIG. 1. FIG. 5A and FIG. 5B are graphs illustrating the results of the Table of FIG. 3.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A kit comprising
  a first component comprising a first polyolefin and a polymerizable epoxide resin, wherein the polymerizable epoxide resin comprises a polymerizable epoxide linker, and
  a second component comprising a second polyolefin and a catalytic agent, wherein the catalytic agent is capable of reacting with the polymerizable epoxide resin to form a covalent bond,
  wherein the first polyolefin is present at more than 80 wt % of the first component and the second polyolefin is present at more than 80 wt % of the second component.

2. The kit of claim 1, wherein either one of or both the first polyolefin and the second polyolefin are present in the respective first component and second component at more than 90 wt % of the respective first component and second component.

3. The kit of claim 1, wherein the first polyolefin and/or the second polyolefin is polypropylene, optionally in a combination with an ethylene-α-olefin copolymer, the ethylene-α-olefin copolymer comprising a repeating unit derived from ethylene and a repeating unit derived from an α-olefin, optionally having 3 to 20 carbon atoms.

4. The kit of claim 1, wherein the polymerizable epoxide resin is present at an amount greater or equal to 0.1 wt % and less than 20 wt % based on the weight of the first component.

5. The kit of claim 1, wherein either one of or both the first component and the second component further comprise a polymer having a functional group grafted thereon.

6. The kit of claim 5, wherein the polymer having a functional group grafted thereon is a third polyolefin having a functional group grafted thereon.

7. The kit of claim 6, wherein the third polyolefin is polypropylene.

8. The kit of claim 5, wherein the polymer having a functional group grafted thereon is a polymer comprising a —COO-group.

9. The kit of claim 1, wherein the catalytic agent is capable of initiating polymerization of the polymerizable epoxide resin.

10. The kit of claim 1, wherein the catalytic agent is present at an amount greater or equal to 0.1 wt % and less than 30 wt % based on the weight of the second component.

11. The kit of claim 1, wherein either one of or both the first component and the second component further comprise an additive selected from the group consisting of an ultraviolet stabilizer, an antioxidant, a pigment and a combination thereof.

12. A method of providing a polyolefin composite, the polyolefin composite comprising a first polyolefin, a polymerizable epoxide linker, and a second polyolefin, the method comprising mixing a first component comprising a first polyolefin and a polymerizable epoxide resin comprising the polymerizable epoxide linker; and a second component comprising a second polyolefin and a catalytic agent, to form a mixture, wherein the catalytic agent is capable of reacting with the polymerizable epoxide resin to form a covalent bond, and wherein the first polyolefin is present at more than 80 wt % of the first component and the second polyolefin is present at more than 80 wt % of the second component, and processing the mixture to obtain the polyolefin composite.

13. The method of claim 12, further comprising adding a filler to the mixture in an amount between about 1 wt % to about 80 wt % based on the weight of the first component, the second component, or both the first component and the second component.

14. The method of claim 12, further comprising adding a further polyolefin to the mixture in an amount greater or equal to 20 wt % and less than 99 wt % based on the weight of the first component, the second component, or both the first component and the second component.

15. The method of claim 12, further comprising adding a polymer having a functional group grafted thereon to the mixture in an amount greater or equal to 0.1 wt % and less than 20 wt % based on the weight of the first component, the second component, or both the first component and the second component.

16. The method of claim 12, wherein the first component and the second component are mixed in a wt % ratio from about 1:1 to about 5:1.

17. The method of claim 12, wherein processing comprises melt-mixing the mixture.

18. A polyolefin composite comprising a first polyolefin, a polymerizable epoxide linker, and a second polyolefin provided by the kit of claim 1.

19. The polyolefin composite of claim 18, wherein the polymerizable epoxide linker is present at about 0.1 wt % to about 30 wt % based on the total weight of the polyolefin composite.

20. The polyolefin composite of claim 18, further comprising an additive, wherein the additive is present at about 0.01 wt % to about 1 wt % based on the total weight of the polyolefin composite.

* * * * *